(No Model.)
W. W. GRIER.
FIFTH WHEEL FOR VEHICLES.
No. 345,585. Patented July 13, 1886.
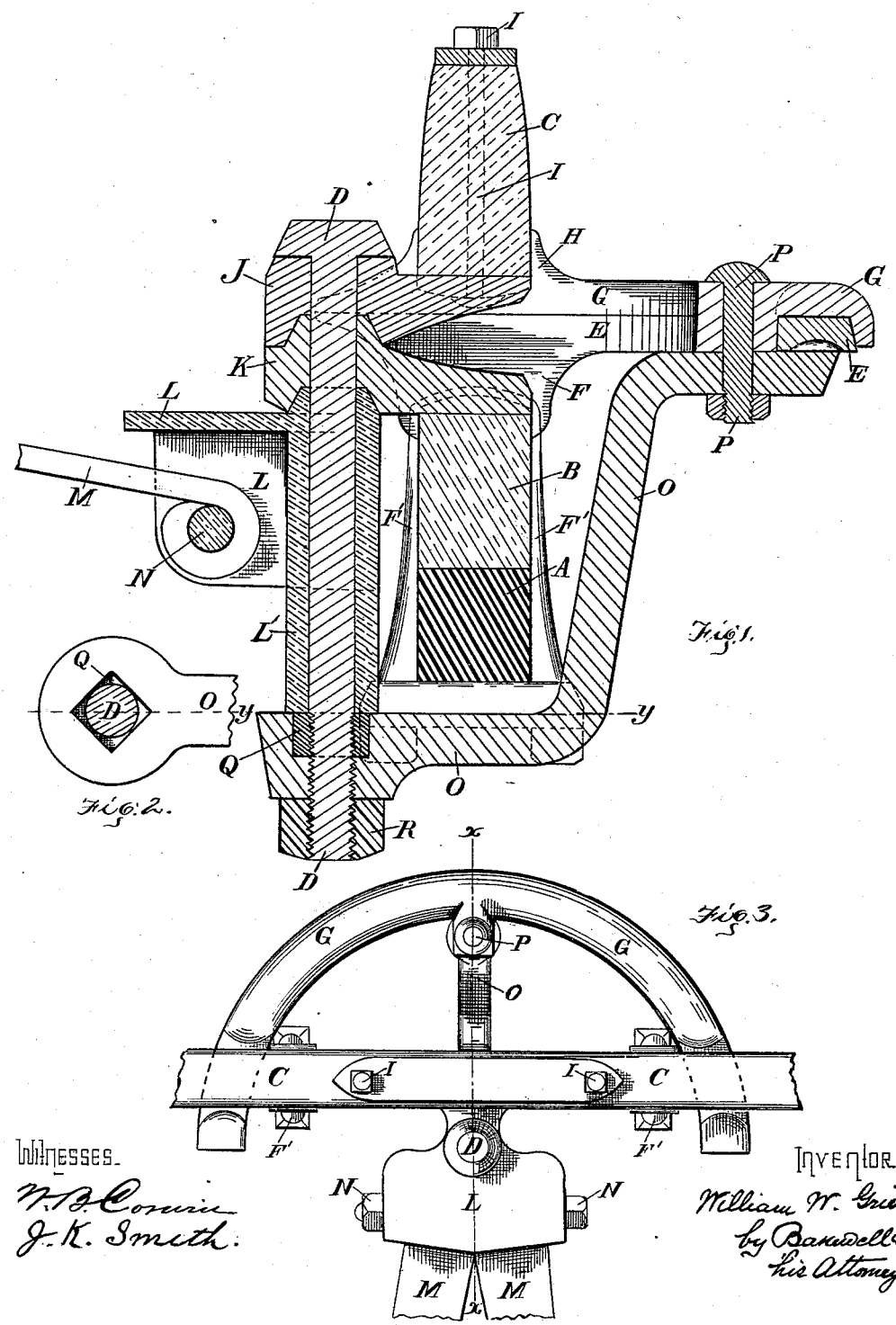

UNITED STATES PATENT OFFICE.

WILLIAM W. GRIER, OF HULTON, PENNSYLVANIA.

FIFTH-WHEEL FOR VEHICLES.

SPECIFICATION forming part of Letters Patent No. 345,585, dated July 13, 1886.

Application filed May 29, 1886. Serial No. 203,579. (No model.)

*To all whom it may concern:*

Be it known that I, WILLIAM W. GRIER, of Hulton, in the county of Allegheny and State of Pennsylvania, have invented a new and useful Improvement in Fifth-Wheels for Vehicles; and I do hereby declare the following to be a full, clear, and exact description thereof, reference being had to the accompanying drawings, forming part of this specification, in which—

Figure 1 is an enlarged vertical section of my improved fifth-wheel applied to the head-block and front axle of a buggy, the section plane being on the line *x x* of Fig. 3. Fig. 2 is a horizontal cross-sectional detail view on the line *y y* of Fig. 1. Fig. 3 is a plan view of the parts shown in Fig. 1.

Like symbols of reference indicate like parts in each.

My improved fifth-wheel is designed for use in running-gear for vehicles having side springs and no perch, and, as shown in the accompanying drawings, is adapted especially for the running-gear known in the trade as "Dexter Queen," having two pairs of springs, the lower pair of which is attached at the rear end to the hind axle near its outer end, and thence converge toward the fifth-wheel. It may, however, be used with vehicle running-gear in which the springs are otherwise arranged.

In the drawings, A is the front axle of the vehicle, (which, in Fig. 3, is represented as broken off at each end.)

B is the wooden axle-bed, placed upon the axle, and C is the bolster or head-block, to which the upper pair of springs is attached.

E is the lower circle-plate of the fifth-wheel, which is secured to the axle-bed B by means of a saddle, F, and clips F'.

G is the upper circle-plate, which is flanged and fits over the circle-plate E, and is secured to the under side of the head-block by a saddle, H, and bolts I. The king-bolt D extends vertically through a lug, J, which projects from the saddle H back of the head-block, and through a similar lug, K, which projects from the saddle F back of the axle-bed B.

L is a spring hanger or shackle, having at its rear a tubular socket, L', which fits around the king-bolt beneath the lug K, the shackle then projecting backward, and being situate above the level of the bottom of the axle, preferably near the top. The ends of the springs M meet in the shackle L, and are pivoted, side by side, on a horizontal bolt, N, which traverses the interior of the shackle. This converging of the springs is an important feature of my invention. The lower end of the king-bolt D is screw-threaded, and is screwed into a brace, O, which extends thence under the axle to the front part of the upper circle-plate, G, to which it is secured by a bolt, P. A nut, Q, fitting within a squared recess in the brace O around the king-bolt, bears on and supports the socket L', and a nut, R, on the lower end of the king-bolt holds the brace in position thereon. In case the nut R should drop off, the king-bolt and brace will still be held by the nut Q.

The advantages of having a spring hanger or shackle back of the axle, as distinguished from having it under or in front of the axle, is, that the springs can thus be brought together to a point on the shackle, which enables the vehicle to be turned much more easily, because the situation of the spring-hanger in the center of the axle removes it out of the way of the axle in turning. An advantage of having the springs meet in the shackle is, that the springs then cannot move lengthwise independently of and against each other, as they do when their ends are separated, but are obliged to act in unison, thus forming a perfect reach, and making the vehicle to track evenly.

One of the advantages of pivoting the hanger to the king-bolt is, that it enables the hanger to be set above the bottom of the axle, and by securing parallelism of the two sets of springs makes the tracking and motion of the vehicle easier. It also enables the point of meeting of the springs M M to be nearly coincident with the pivotal point of the fifth-wheel.

I claim—

1. The combination, with the front axle and head-block, of a spring-hanger situate back of the axle and above the level of the bottom thereof, substantially as and for the purposes described.

2. The combination of a fifth-wheel, a king-bolt situate back of the axle, and a spring-hanger mounted on the king-bolt, substantially as and for the purposes described.

3. The combination of a head-block, a spring-hanger situate above and back of the axle, and springs extending from substantially a common point in the hanger and diverging to the rear axle, as and for the purposes described.

4. The combination of a head-block, a king-bolt situate back of the axle, and a spring-hanger having a socket which is mounted on the king-bolt, substantially as and for the purposes described.

In testimony whereof I have hereunto set my hand this 26th day of May, A. D. 1886.

WILLIAM W. GRIER.

Witnesses:
W. B. CORWIN,
THOMAS W. BAKEWELL.